US009002142B2

(12) United States Patent
Hung

(10) Patent No.: US 9,002,142 B2
(45) Date of Patent: Apr. 7, 2015

(54) METHOD FOR GENERATING A CUSTOMIZED COMPOSITE MAP IMAGE AND ELECTRONIC APPARATUS FOR IMPLEMENTING THE SAME

(75) Inventor: Shun-Cheng Hung, Taipei (TW)

(73) Assignee: Mitac International Corp., Hsinchu Hsien (TW)

( * ) Notice: Subject to any disclaimer, the term of this patent is extended or adjusted under 35 U.S.C. 154(b) by 924 days.

(21) Appl. No.: 13/012,995

(22) Filed: Jan. 25, 2011

(65) Prior Publication Data
US 2011/0181620 A1    Jul. 28, 2011

(30) Foreign Application Priority Data

Jan. 26, 2010  (TW) .............................. 99102081 A

(51) Int. Cl.
*G06K 9/32*    (2006.01)
*G01C 21/32*   (2006.01)

(52) U.S. Cl.
CPC ...................................... *G01C 21/32* (2013.01)

(58) Field of Classification Search
None
See application file for complete search history.

(56) References Cited

U.S. PATENT DOCUMENTS

| 6,148,262 A | 11/2000 | Fry |
| 2005/0220363 A1 | 10/2005 | Oldroyd |
| 2007/0014488 A1* | 1/2007 | Chen et al. ................... 382/294 |
| 2008/0192053 A1* | 8/2008 | Howell et al. ................ 345/427 |
| 2011/0143707 A1* | 6/2011 | Darby et al. ............... 455/404.2 |

FOREIGN PATENT DOCUMENTS

| TW | 200848702 | 12/2008 |
| TW | I305886 | 2/2009 |
| TW | 200949201 | 12/2009 |

* cited by examiner

*Primary Examiner* — David H Chu
(74) *Attorney, Agent, or Firm* — Vedder Price, P.C.

(57) ABSTRACT

A method is to be implemented by an electronic apparatus having a map database established therein, and includes the steps of: receiving a user-specified input image of an area of interest, and obtaining from the map database a reference map that encompasses the area of interest; selecting a set of feature points in the user-specified input image, and a set of map points in the reference map that correspond in geographical features to the feature points; transforming the user-specified input image according to positional differences between the feature points and the corresponding map points to thereby obtain a to-be-registered image having adjusted feature points corresponding in position to the map points; overlaying the to-be-registered image onto the reference map to thereby obtain a customized composite map image; and outputting the customized composite map image.

12 Claims, 6 Drawing Sheets

METHOD FOR GENERATING A CUSTOMIZED COMPOSITE MAP IMAGE AND ELECTRONIC APPARATUS FOR IMPLEMENTING THE SAME

CROSS-REFERENCE TO RELATED APPLICATION

This application claims priority of Taiwanese Application No. 099102061, filed on Jan. 26, 2010.

BACKGROUND OF THE INVENTION

1. Field of the Invention

The present invention relates to a method for generating a map image, more particularly to a method for generating a customized composite map image.

2. Description of the Related Art

The Global Positioning System (GPS) was originally developed for military purpose, but has recently been employed in various commercial applications, such as GPS navigation. As GPS navigation becomes ubiquitous, more and more telecommunication service providers and personal navigation device (PND) manufacturers now provide location-based services, e.g., provision of points of interest (POI) according to locality of service subscribers.

However, maps and POI provided by the telecommunication service providers and the PND manufacturers are not customized and might not satisfy needs of the service subscribers.

SUMMARY OF THE INVENTION

Therefore, an object of the present invention is to provide a method for generating a customized composite map image.

According to a first aspect, a method of the present invention is to be implemented by an electronic apparatus that has a map database established therein, and includes the steps of:

a) receiving a user-specified input image of an area of interest;

b) obtaining from the map database a reference map that encompasses the area of interest;

c) selecting a set of feature points in the user-specified input image and a set of map points in the reference map that correspond in geographical features to the feature points;

d) automatically transforming the user-specified input image according to positional differences between the feature points and the corresponding map points so as to obtain a to-be-registered image having adjusted feature points corresponding in position to the map points;

e) automatically overlaying the to-be-registered image onto the reference map in a manner that the adjusted feature points coincide with the corresponding map points to thereby obtain a customized composite map image; and f) outputting the customized composite map image.

Another object of the present invention is to provide an electronic apparatus capable of generating a customized composite map image.

According to a second aspect, an electronic apparatus of the present invention includes a memory unit, an image processing coupled to the memory unit, and an image output unit.

The memory unit is for storing a map database and a user-specified input image of an area of interest. The map database contains a reference map that encompasses the area of interest. The memory unit further stores information of a set of feature points in the user-specified input image and a set of map points in the reference map that correspond in geographical features to the feature points.

The image processing unit includes an image transforming module and an image-overlaying module. The image transforming module is for transforming the user-specified input image according to positional differences between the feature points and the map points so as to obtain a to-be-registered image having adjusted feature points corresponding in position to the map points. The image-overlaying module is for overlaying the to-be-registered image onto the reference map in a manner that the adjusted feature points coincide with the corresponding map points to thereby obtain a customized composite map image.

The image output unit is coupled to the image processing unit for receiving the customized composite map image therefrom, and is for outputting the customized composite map image.

BRIEF DESCRIPTION OF TEE DRAWINGS

Other features and advantages of the present invention will become apparent in the following detailed description of the preferred embodiments with reference to the accompanying drawings, of which:

DETAILED DESCRIPTION OF THE PREFERRED EMBODIMENTS

Figure 1:
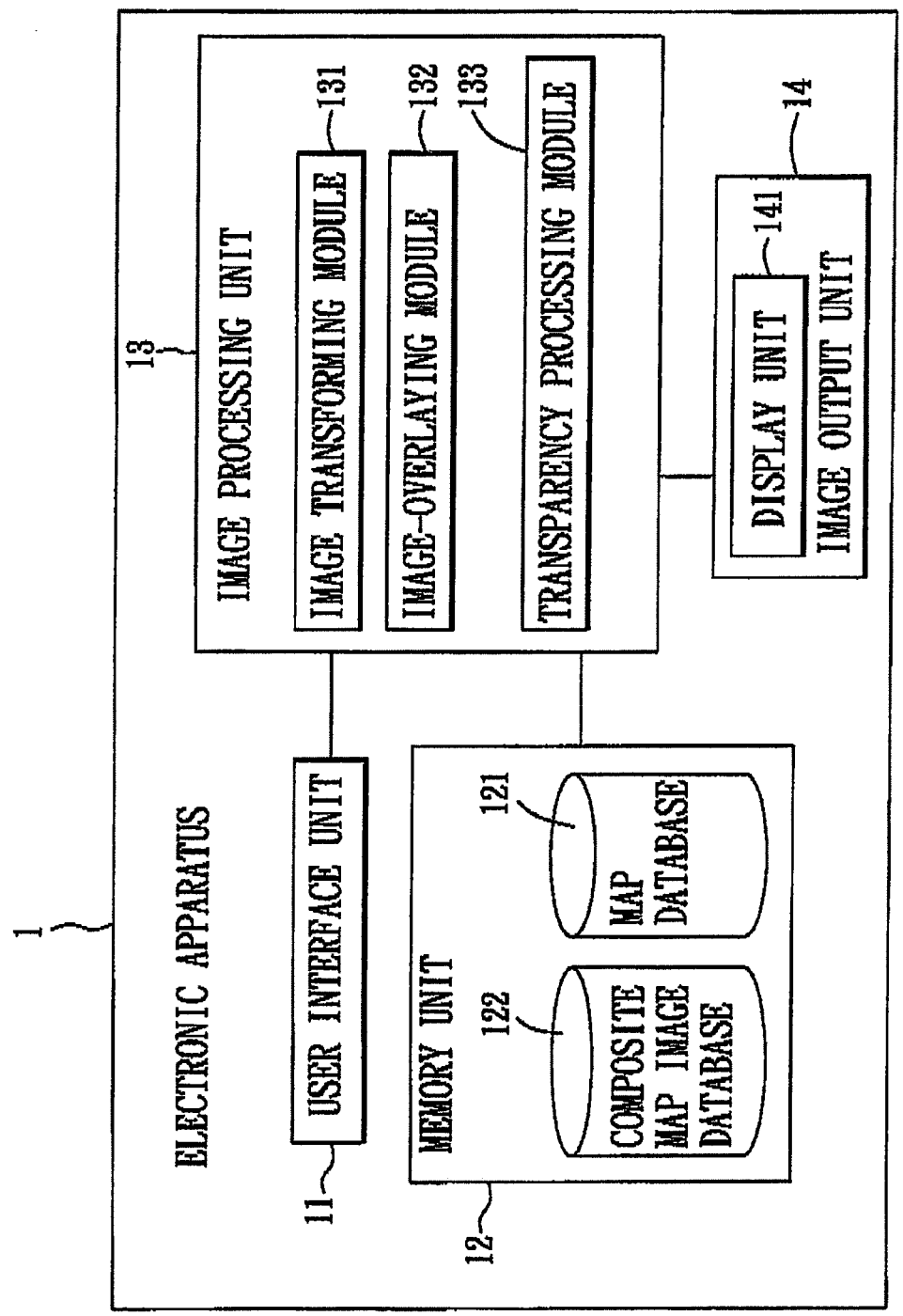
FIG. 1 is a functional block diagram of the first preferred embodiment of an electronic apparatus according to the present invention.

Before the present invention is described in greater detail, it should be noted that like elements are denoted by the same reference numerals throughout the disclosure.

Referring to FIG. 1, the first preferred embodiment of an electronic apparatus 1 according to the present invention is exemplified as a personal navigation device (PND), and includes a user interface unit 11, a memory unit 12, an image processing unit 13, and an image output unit 14.

The user interface unit 11 is coupled to the image processing unit 13 for providing a user input that specifies a location of an area of interest, and a user-specified input image of the area of interest, to the image processing unit 13.

The memory unit 12 stores a map database 121, a composite map image database 122, and the user-specified input image of the area of interest. The map database 121 contains a reference map that encompasses the area of interest. The memory unit 12 further stores information of a set of feature points in the user-specified input image and a set of map points in the reference map corresponding in geographical features to the feature points.

The image processing unit 13 is coupled to the memory unit 12, and includes an image transforming module 131, an image-overlaying module 132, and a transparency processing module 133. The image output unit 19 is coupled to the image processing unit 13, and includes a display unit 141 for displaying images received from the image processing unit 13.

Figure 2:
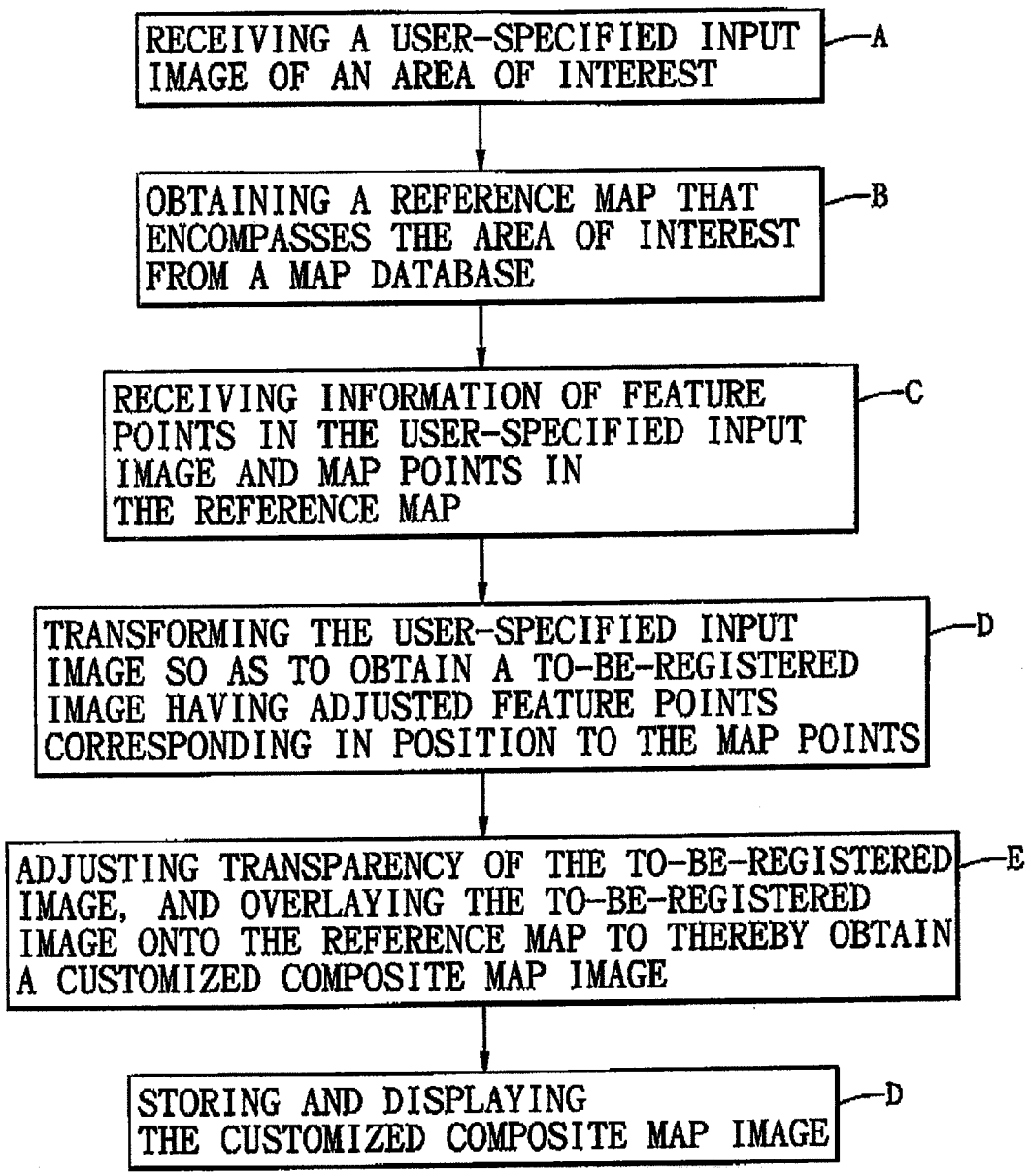
FIG. 2 is a flowchart illustrating steps of the first preferred embodiment of a method for generating a customized composite map image, according to the present invention.

Referring to FIG. 2, the electronic apparatus 1 of the first preferred embodiment is configured to perform the first preferred embodiment of a method for generating a customized composite map image, according to the present invention. In the present embodiment, the user interface unit 11, the image processing unit 13, and the output unit 14 are implemented by a processor of the electronic apparatus 1 loaded with a proprietary software program.

Figure 3:
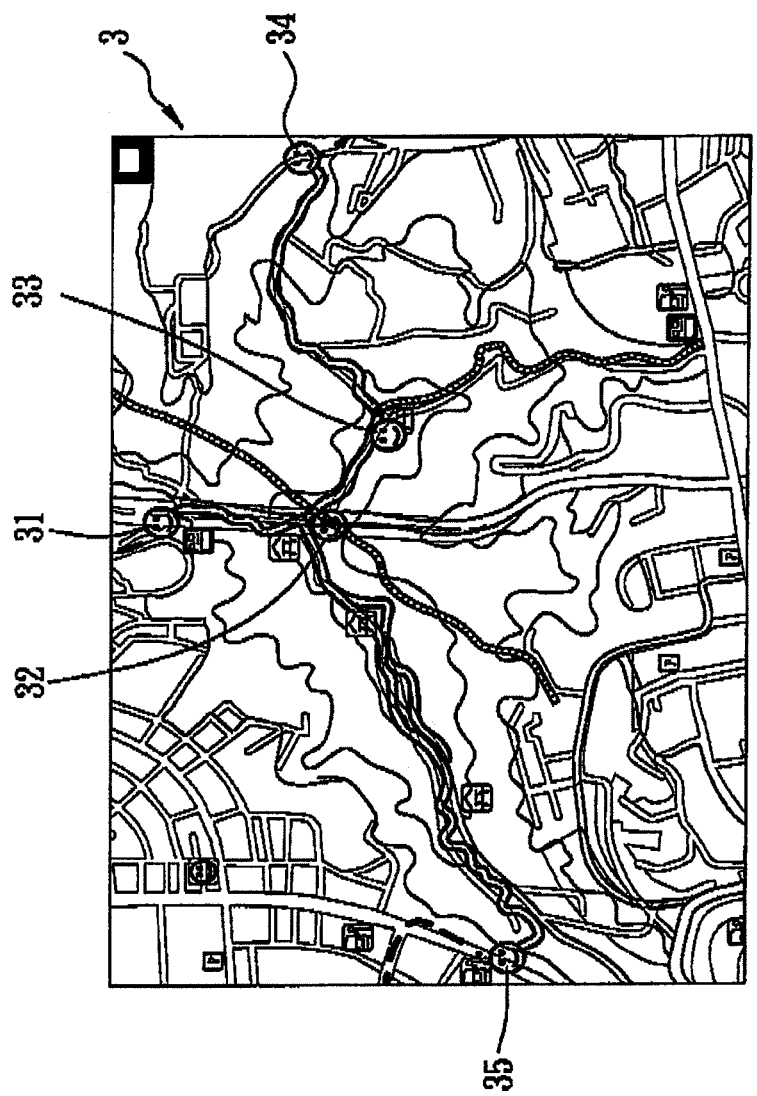
FIG. 3 is a screenshot of a user-specified input image of an area of interest.

In step a), referring to FIG. 3, the image processing unit 13 is configured to receive the user-specified input image 3 of the area of interest from the user interface unit 11, and to provide the user-specified input image 3 to the memory unit 12 for storage therein. Moreover, the user-specified input image 3 is stored in the memory unit 12 with a file path, a file name, and a source of image that are user-specified through the user interface unit 11. The user-specified input image 3, in the present embodiment, is one of a landmark guide map (e.g., a map of the White House or a map of a theme park), an establishment guide map, and a road map, and may be obtained such as through downloading from a website and capturing using an image-capturing device.

Figure 4:
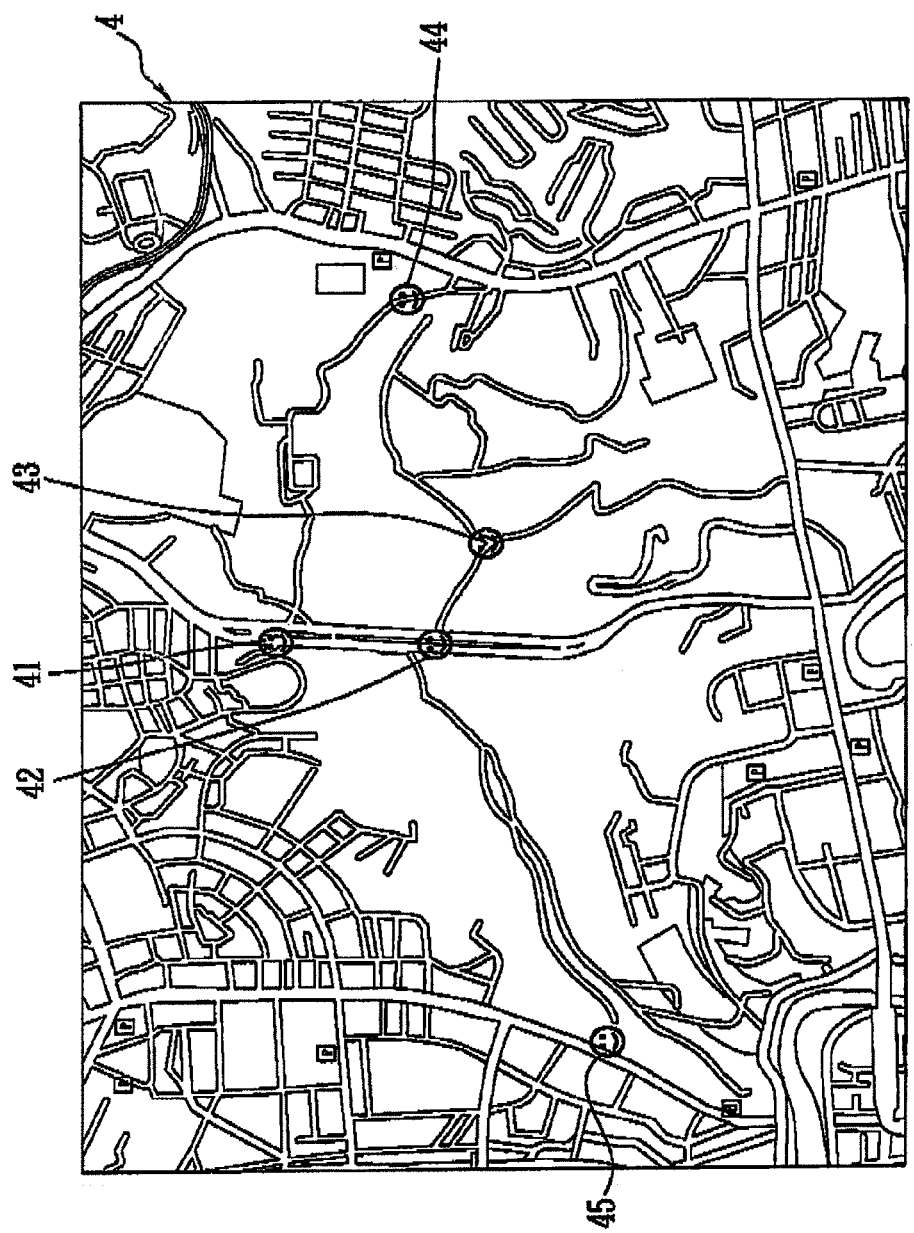
FIG. 4 is a screenshot of a reference map that encompasses the area of interest.

In step b), referring to FIG. 4, the image processing unit 13 is configured to obtain the reference map 4 from the map database 121 in response to the user input from the user interface unit 11 that specifies the location of the area of interest. It is to be noted that map databases provided by telecommunication service providers and no manufacturers generally do not include information associated with geographical features (e.g., roads and paths) located within regions corresponding to such as landmarks and geographical establishments. Such regions of maps obtained from the map databases are therefore generally marked but do not show any geographical information.

In step c), the image processing unit 13 is configured to receive from the user interface unit 11 the feature points 31-35 and the map points 41-45, which, in the present embodiment, are user-selected and inputted to the electronic apparatus 1 through the user interface unit 11. The image processing unit 13 is further configured to provide the feature points 31-35 and the map points 41-45 to the memory unit 12 for storage therein. Each of the feature points 31-35 may be a T-intersection, a y-intersection, a main road, a landmark, etc.

In step d), the image transforming module 131 is configured for automatically transforming the user-specified input image 3 according to positional differences between the feature points 31-35 and the corresponding map points 41-45 so as to obtain a to-be-registered image having adjusted feature points corresponding in position to the map points 41-45. In the present embodiment, transforming of the user-specified input image 3 includes at least one of rotation transformation and scaling transformation. It is to be noted that, under circumstances where not all of the adjusted feature points correspond substantially in position to the feature points 31-35, those of the adjusted feature points chosen for subsequent operations are preferably ones that are relatively far apart from one another such that the subsequent operations produce a more accurate result.

Figure 5:
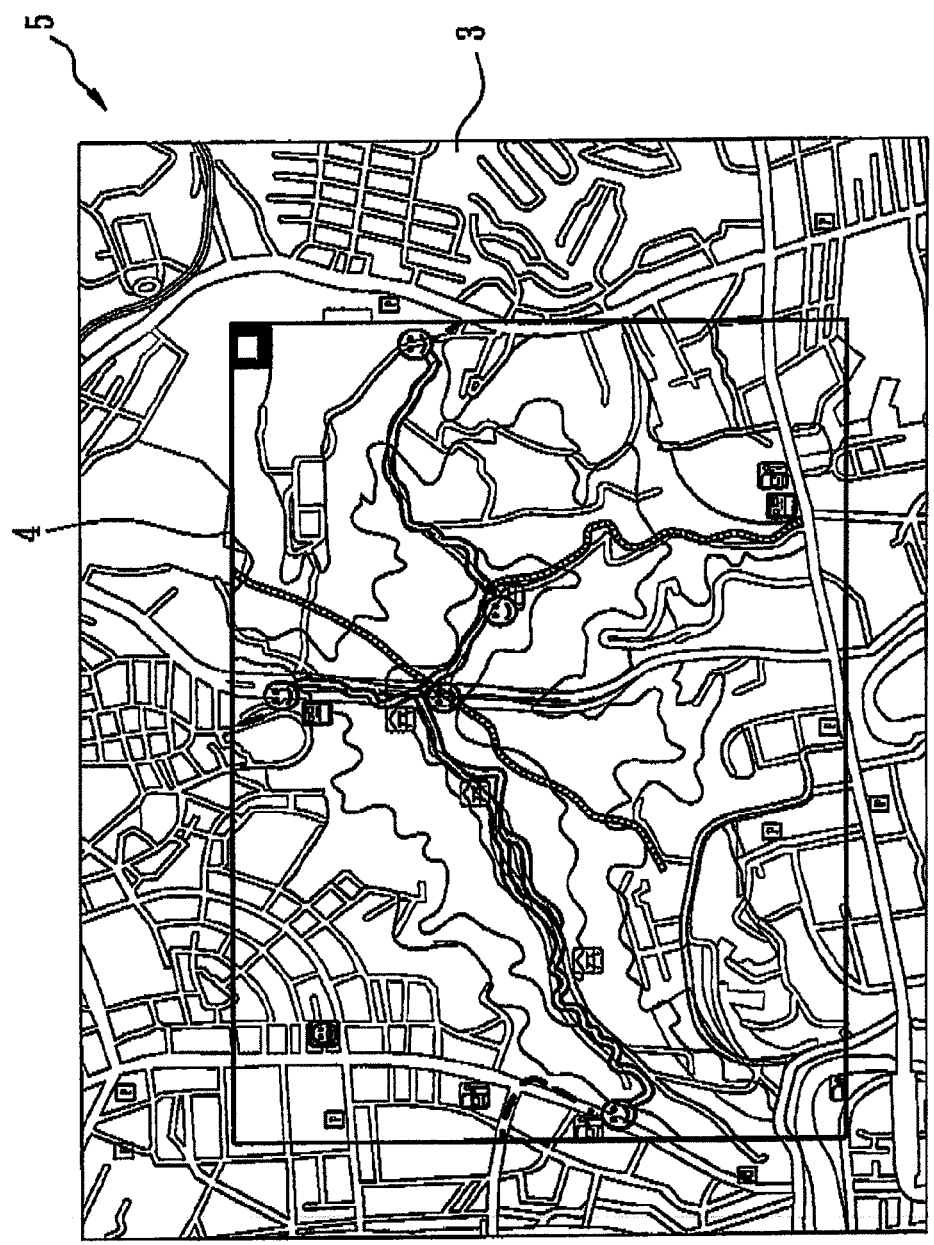
FIG. 5 is a screenshot of a customized composite map image generated through image overlay of the user-specified input image onto the reference map.

In step e), referring to FIG. 5, the image-overlaying module 132 is configured to automatically overlay the to-be-registered image onto the reference map 4 in a manner that the adjusted feature points coincide with the corresponding map points 41-45 to thereby obtain a customized composite map image 5. Furthermore, the transparency processing module 133 is configured for adjusting transparency of the to-be-registered image in accordance with a user setting received by the image processing unit 13 via the user interface unit 11 when the to-be-registered image is overlaid onto the reference map 4 by the image-overlaying module 132. In this embodiment, transparency may be adjusted according to a selected one of a high transparency setting (75% transparency), a medium transparency setting (50% transparency), and a low transparency setting (30% transparency).

In step f), the image processing unit 13 is configured to provide the customized composite map image 5 to the composite image map database 122 for storage therein, so that the customized composite map image 5 may be accessible for future use, and to the image output unit 14 for display of the customized composite map image 5 by the display unit 141, so that the user may view the customized composite map image 5.

It is worth noting that, in other embodiments, the set of feature points may include only three feature points that are preferably located relatively far from one another.

Figure 6:
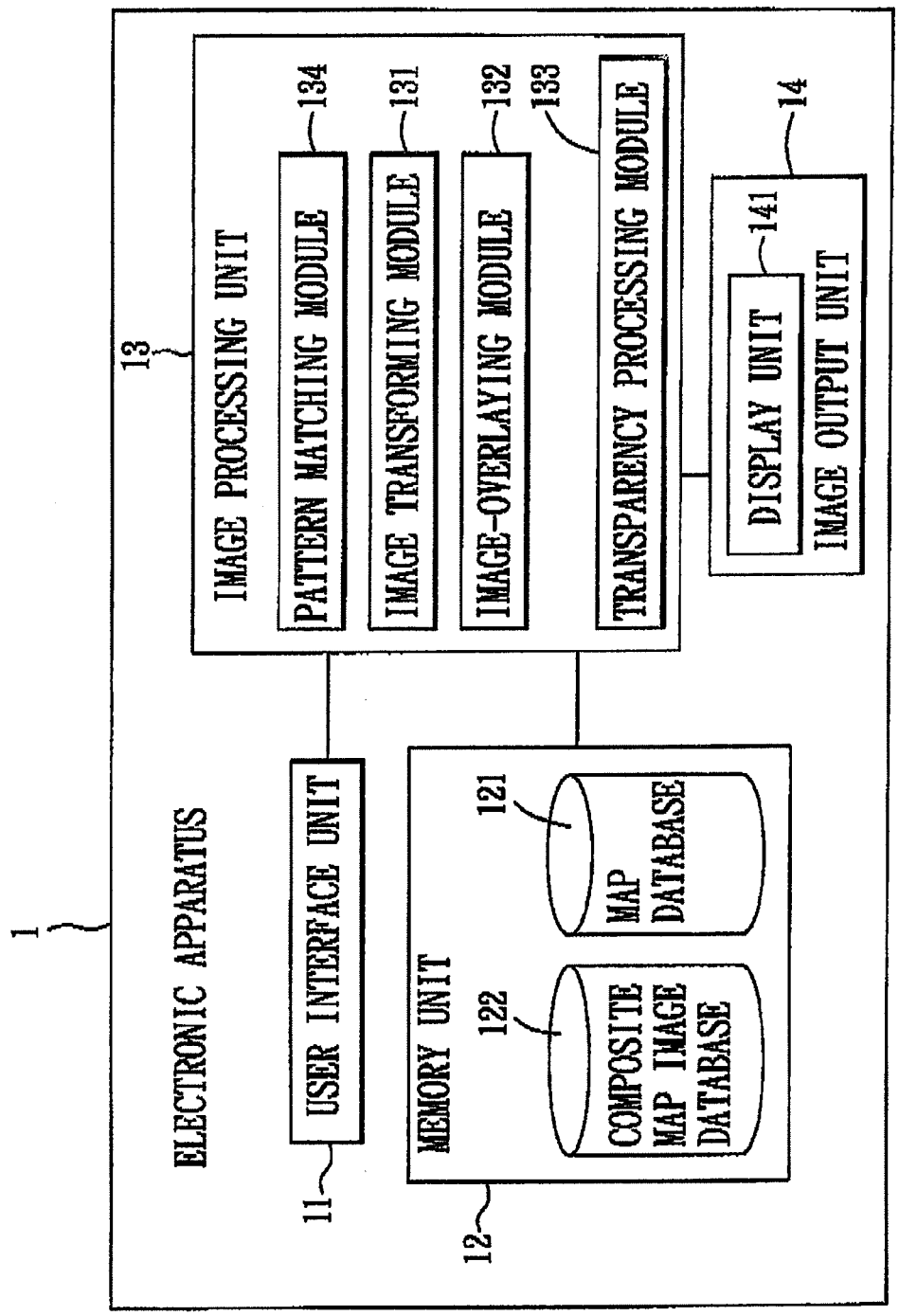
FIG. 6 is a functional block diagram of the second preferred embodiment of an electronic apparatus according to the present invention.

Referring to FIG. 6, in comparison with the first preferred embodiment, the feature points 31-35 and the map points 41-45 are not user-selected in the second preferred embodiment. In the second preferred embodiment, the image processing unit 13 further includes a pattern matching module 134, which is configured, in step c), for selecting the feature points 31-35 and the map points 41-45 through pattern matching of the user-specified input image 3 with the reference map 4 according to a set of user-configured selection rules. The set of user-configured selection rule defines at least one of a T-intersection, a Y-intersection, a main road, and a landmark, for pattern matching of the geographical features of the user-specified input image 3 with the reference map 4.

In summary, users of the electronic apparatus 1 (i.e., the PND) are able to generate in the electronic apparatus customized composite map images that contain customized points of interest (POI).

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for generating a customized composite map image, said method to be implemented by a personal navigation device that has a map database established therein and comprising the steps of:
   a) receiving, by the personal navigation device, a user-specified input image of an area of interest, the user-specified input image being one of a landmark guide map, an establishment guide map, and a road map;
   b) obtaining, by the personal navigation device, from the map database a reference map that encompasses the area of interest;
   c) selecting, by the personal navigation device, a set of feature points in the user-specified input image and a set of map points in the reference map that correspond in geographical features to the feature points;
   d) automatically transforming, by the personal navigation device, the user-specified input image according to positional differences between said feature points and the corresponding map points so as to obtain a to-be-registered image having adjusted feature points corresponding in position to the map points;
   e) automatically overlaying, by the personal navigation device, the to-be-registered image onto the reference map in a manner that the adjusted feature points coincide with the corresponding map points to thereby obtain a customized composite map image; and f) outputting, by the personal navigation device, the customized composite map image;

wherein, in step c), the feature points and the map points are automatically selected by the personal navigation device through pattern matching of the user-specified input image with the reference map according to a set of pre-defined user-configured selection rules;

wherein the set of pre-defined user-configured selection rules defines at least one of a T-intersection, a Y-intersection, a main road, and a landmark, for pattern matching of the geographical features of the user-specified input image with the reference map.

2. The method as claimed in claim 1, wherein, in step b), the reference map is obtained from the map database in response to a user input that specifies a location of the area of interest.

3. The method as claimed in claim 1, wherein, in step d), transforming of the user-specified input image includes at least one of rotation transformation and scaling transformation.

4. The method as claimed in claim 1, wherein, in step f), the customized composite map image is outputted via a display unit of the personal navigation device.

5. The method as claimed in claim 1, further comprising the step of configuring the personal navigation device for adjusting transparency of the to-be-registered image in accordance with a user setting when the to-be-registered image is overlaid onto the reference map.

6. A program product comprising a machine readable storage medium that comprises program instructions for configuring a personal navigation device having a map database established therein to perform steps of a method for generating a customized composite map image according to claim 1.

7. A personal navigation device comprising:

a memory unit for storing a map database and a user-specified input image of an area of interest, the map database containing a reference map that encompasses the area of interest, the user-specified input image being one of a landmark guide map, an establishment guide map, and a road map, said memory unit further storing information of a set of feature points in the user-specified input image and a set of map points in the reference map that correspond in geographical features to the feature points;

an image processing unit coupled to said memory unit, and including an image transforming module for transforming the user-specified input image according to positional differences between the feature points and the map points so as to obtain a to-be-registered image having adjusted feature points corresponding in position to the map points, and an image-overlaying module for overlaying the to-be-registered image onto the reference map in a manner that the adjusted feature points coincide with the corresponding map points to thereby obtain a customized composite map image; and an image output unit coupled to said image processing unit for receiving the customized composite map image therefrom, and for outputting the customized composite map image;

wherein said image processing unit further includes a pattern matching module for selecting the feature points and the map points through pattern matching of the user-specified input image with the reference map according to a set of pre-defined user-configured selection rules;

wherein the set of pre-defined user-configured selection rules defines at least one of a T-intersection, a Y-intersection, a main road, and a landmark, for pattern matching of the geographical features of the user-specified input image with the reference map.

8. The personal navigation device as claimed in claim 7, further comprising a user interface unit coupled to said image processing unit for providing a user input that specifies a location of the area of interest to said image processing unit, said image processing unit being configured to obtain the reference map from said map database in response to the user input from said user interface unit.

9. The personal navigation device as claimed in claim 7, wherein transforming of the user-specified input image by said image transforming module includes at least one of rotation transformation and scaling transformation.

10. The personal navigation device as claimed in claim 7, wherein said image output unit includes a display unit for display of the customized composite map image received from said image processing unit.

11. The personal navigation device as claimed in claim 7, wherein said image processing unit is configured to store the customized composite map image in said memory unit.

12. The personal navigation device as claimed in claim 7, further comprising a user interface unit coupled to said image processing unit for providing a user setting thereto, and said image processing unit further includes a transparency processing module for adjusting transparency of the to-be-registered image in accordance with the user setting from said user interface unit when the to-be-registered image is overlaid onto the reference map by said image-overlaying module.

* * * * *